United States Patent [19]

Tiedemann, Jr. et al.

[11] Patent Number: 5,987,326
[45] Date of Patent: Nov. 16, 1999

[54] TRANSMIT POWER REDUCTION FOR A HIGH SPEED CDMA LINK IN SOFT HANDOFF

[75] Inventors: Edward G. Tiedemann, Jr.; Yu-Cheun Jou, both of San Diego, Calif.

[73] Assignee: Qualcomm Incorporated, San Diego, Calif.

[21] Appl. No.: 08/798,949

[22] Filed: Feb. 11, 1997

[51] Int. Cl.[6] .................................................. H04Q 7/00
[52] U.S. Cl. ......................... 455/442; 455/440; 455/443; 370/331
[58] Field of Search ................................. 445/442, 440, 445/441, 436, 437, 438, 439, 456; 370/320, 335, 441, 331; 455/442, 440, 441

[56] References Cited

U.S. PATENT DOCUMENTS

| 4,112,257 | 9/1978 | Frost ........................................ 179/2 EB |
| 4,123,718 | 10/1978 | Lampert et al. ......................... 325/474 |
| 4,765,753 | 8/1988 | Schmidt ..................................... 379/60 |
| 4,777,653 | 10/1988 | Bonnerot et al. ........................... 455/69 |
| 4,811,421 | 3/1989 | Havel et al. ............................... 455/69 |
| 4,868,795 | 9/1989 | McDavid et al. .......................... 367/77 |
| 4,870,698 | 9/1989 | Katsuyama et al. ...................... 455/67 |
| 4,901,307 | 2/1990 | Gilhousen et al. ........................ 370/18 |
| 5,056,109 | 10/1991 | Gilhousen et al. ......................... 375/1 |
| 5,093,840 | 3/1992 | Schilling ..................................... 375/1 |
| 5,101,501 | 3/1992 | Gilhousen et al. ....................... 455/33 |
| 5,103,459 | 4/1992 | Gilhousen et al. ......................... 375/1 |
| 5,107,487 | 4/1992 | Vilmur et al. .............................. 370/18 |
| 5,128,965 | 7/1992 | Henriksson ................................ 375/58 |
| 5,204,876 | 4/1993 | Bruckert et al. ............................ 375/1 |
| 5,220,678 | 6/1993 | Feei ............................................ 455/69 |
| 5,245,629 | 9/1993 | Hall ............................................. 375/1 |
| 5,257,293 | 10/1993 | Gilhousen et al. ......................... 375/1 |
| 5,265,119 | 11/1993 | Gilhousen et al. ......................... 375/1 |
| 5,267,261 | 11/1993 | Blakeney, II et al. .................... 455/442 |
| 5,267,262 | 11/1993 | Wheatley, III ............................. 375/1 |
| 5,305,468 | 4/1994 | Bruckert et al. ........................... 455/69 |
| 5,383,219 | 1/1995 | Wheatley, III et al. ..................... 375/1 |
| 5,390,338 | 2/1995 | Bodin et al. ............................ 455/33.1 |
| 5,450,616 | 9/1995 | Rom ............................................ 455/69 |
| 5,465,399 | 11/1995 | Oberholtzer et al. ...................... 455/69 |
| 5,487,180 | 1/1996 | Ohtake ..................................... 455/54.1 |
| 5,551,057 | 8/1996 | Mitra ........................................ 455/522 |
| 5,623,486 | 4/1997 | Dohi et al. ............................... 370/342 |
| 5,734,646 | 3/1998 | I et al. ..................................... 370/335 |
| 5,771,451 | 6/1998 | Takai et al. .............................. 455/442 |

FOREIGN PATENT DOCUMENTS 9406218  3/1994  WIPO ............................. H04Q 7/04

Primary Examiner—Edward F. Urban
Assistant Examiner—Thuan T. Nguyen
Attorney, Agent, or Firm—Russell B. Miller; Bruce W. Greenhaus; Kent D. Baker

[57] ABSTRACT

A method and apparatus for controlling the transmit power of a high rate code division multiple access (CDMA) link is described. The channel condition to a subscriber unit is evaluated and the configuration of a high rate link in soft handoff is based on the channel condition. If a fading channel is detected the supplemental channels of the high rate link are transmitted from multiple base stations. If a non-fading channel is detected the supplemental channels of the high rate link are transmitted from a single base station. Parameters monitored to determine the channel condition include the pilot strength, pilot code offset and error rate.

14 Claims, 3 Drawing Sheets

TRANSMIT POWER REDUCTION FOR A HIGH SPEED CDMA LINK IN SOFT HANDOFF

BACKGROUND OF THE INVENTION

I. Field of the Invention

The present invention relates to wireless telecommunications. More particularly, the present invention relates to a novel and improved method and apparatus for controlling the transmit power of a high rate code division multiple access link.

II. Description of the Related Art

FIG. 1 is a schematic diagram of a cellular telephone system configured in accordance with the use of the IS-95 over-the-air interface standard. The IS-95 standard, and its derivatives such as IS-95-A, IS-99, IS-657 and ANSI JSTD-008 etc. (referred to herein collectively as the IS-95 standard), define an interface for implementing a digital cellular telephone system using code division multiple access (CDMA) signal processing techniques. Also, a cellular telephone system configured substantially in accordance with the use of IS-95 is described in U.S. Pat. No. 5,103,459 entitled "System and Method for Generating Signal Waveforms in a CDMA Cellular Telephone System" assigned to the assignee of the present invention and incorporated herein by reference.

As is typical for most cellular telephone systems, IS-95 allows mobile telephone service to be provided using a set of base stations 12 coupled to the public switched telephone network (PSTN) 18 by a base station controller (BSC) 14 and a mobile switching center (MSC) 16. During a telephone call, a subscriber unit 10 (typically a cellular telephone) interfaces with one or more base stations 12 using CDMA modulated radio frequency (RF) signals. Throughout this application, the term subscriber unit refers generically to a communications device remotely located from a base station 12, and includes mobile units, hand units, and all other similar communication devices. The RF signal transmitted from the base station 12 to the subscriber unit 10 is referred to as the forward link, and the RF signal transmitted from the subscriber unit 10 to the base station 12 is referred to as the reverse link.

Unlike most other cellular telephone systems, IS-95 communication systems are capable of performing soft handoff when a subscriber unit 10 transitions from the coverage area of a first base station 12 to the coverage area of a second base station 12. In soft handoff, the subscriber unit 10 establishes a communication link with the second base station 12 before terminating the communication link with the first base station. Thus, soft handoff requires simultaneously interfacing with both the first and second base stations 12, which is the condition of subscriber unit 10b as shown in FIG. 1. The preferred embodiments for performing soft handoff are described in U.S. Pat. No. 5,267,261 entitled "Mobile Station Assisted Soft Handoff in a CDMA Cellular Communications System" assigned to the assignee of the present invention and incorporated herein by reference. Soft handoff can be contrasted with hard handoff in which the link with the first base station is terminated before the link with the second base station is established.

Soft handoff is generally necessary in a CDMA based cellular telephone system because adjacent base stations transmit in the same RF band, and the interference between the two forward link signals at the border of the coverage areas fluctuates rapidly and unpredictably. The fading caused by this interference results in a poor received signal to noise ratio at the subscriber unit 10, which further results in either a higher required transmit power from the base station 12, or a higher error rate, or a combination thereof. During soft handoff, both the first and second base stations 12 transmit copies of the user data directed to subscriber unit 10 to provide signal source diversity. Thus, if one base station 12 fades relative to the other base station 12, the subscriber unit 10 still receives one signal properly. Also, the two forward link signals can be combined at the subscriber unit 10, which can result in proper reception even when neither forward link signal alone was received at a sufficient level.

It should be noted that soft handoff can also involve three or more base stations 12, all transmitting copies of the data directed to subscriber unit 10. In general, the signal diversity provided by soft handoff makes it more robust than hard handoff, in that the call is less likely to be dropped.

Although soft handoff has the advantage of being more robust than hard handoff, it has the disadvantage of requiring two or more transmissions of the same user data. Within an IS-95 compliant or other type of CDMA cellular telephone system, these multiple transmissions may increase or decrease overall capacity of the cellular telephone system. Whether there is an increase or decrease depends of the fading condition for the subscriber unit 10.

More recently, however, it has become desirable to provide higher transmission rate communication services in conjunction with the mobile telephone service already provided by an IS-95 cellular telephone system. Examples of such higher rate links are described in copending U.S. patent applications Ser. No. 08/656,649 filed May 31, 1996 entitled "Method and Apparatus for Providing Rate Scheduled Data in a Spread Spectrum Communication System and Ser. No. 08/784,280 entitled "High Data Rate Supplemental Channel for CDMA Telecommunications System" filed Jan. 15, 1997 both assigned to the assignee of the present invention and incorporated herein by reference (high data rate patent applications).

These higher rate communications are transmitted with substantially greater power than the typical voice based communications, which substantially increases the negative impact of generating multiple transmissions as during a soft handoff. Since it is nonetheless desirable to allow a subscriber unit 10 conducting a high speed communication to transition between the coverage areas of different base stations 12, an alternative method and apparatus for performing handoff is required.

SUMMARY OF THE INVENTION

The capacity of a CDMA cellular telephone system is maximized if the transmit power for each communication is minimized while maintaining the same error rate. When fading is present during a soft handoff transmitting the forward link signal from two base stations usually results in the least total amount of power, where the total amount of power is the sum of the powers radiated by the base stations to the subscriber unit. When fading is not present during soft handoff, transmitting the forward link signal from one base station uses the least amount of power, as no benefit is gained from signal source diversity. The present invention seeks to optimize the performance of a CDMA cellular telephone system by conducting the soft handoff in the most efficient state based on the channel condition being experienced by the subscriber unit.

There have been a few proposals to increase the transmission data rate of an IS-95/ANSI-J-008 based CDMA cellular/PCS system. Two preferred methods for increasing the available data rates of forward link transmission of CDMA communication systems are disclosed in the aforementioned high data rate patent application. In order to increase the data rate on the forward link, multiple Walsh code channels are combined to transmit data to one user. In a first embodiment for transmitting high speed data over the forward link, a plurality of Walsh channels conforming to the IS-95 standard independently carry portions of the data stream to the remote high speed data receiver. In the alternative, a high speed data channel can be provided wherein the high speed data channel is generated by a combination of available Walsh channels to provide an equivalent code channel spread by a shorter Walsh code. For either case, a high data rate user is assigned a fundamental code channel which carries signaling messages and the reverse link power control subchannel in addition to data traffic. In addition, the high data rate user is also assigned one or more supplemental code channels which carries data traffic only when transmitted in accordance with the methods described above. The the supplemental code channels may comprise a set of Walsh code channels being transmitted to the remote high speed receiver other than the fundamental channel. The the supplemental code channels may alternatively comprise a combination of Walsh channels used to provide a shortened Walsh channel.

In many cases, data users are stationary. When a subscriber unit is stationary, soft handoff does not provide any performance gain on the forward link. When a subscriber unit is receiving high speed digital data, only the base station which is best received by the subscriber unit should transmit data to this subscriber unit in order to optimize the use of forward link capacity. However, when a subscriber unit is non-stationary, soft handoff usually provides performance gain on the forward link. In that case, there may be an advantage to transmit data to the subscriber unit from multiple base stations. Thus, one goal of the present invention is to detect if a subscriber unit is stationary and if so to prevent the subscriber unit from entering into soft handoff. Additionally, even when the subscriber unit is non-stationary, there are situations when only the base station which is being received the strongest at the subscriber unit should be transmitting to the subscriber unit in order to maximize capacity. This typically happens when there is sufficient multipath from a particular base station. The invention aims to determine when it is preferable for a single base station to transmit to a non stationary subscriber unit.

In a first embodiment of the present invention, the communication system provides for independent handoff of the fundamental code channel and supplemental code channels on the forward link. Because there are different performance requirements on the fundamental code channel and supplemental code channels, allowing the fundamental code channel to be in soft handoff without the supplemental code channel being in soft handoff provides flexibility to optimize the use of the forward link for high speed data transmission. In a preferred embodiment, the reverse link is in soft handoff (i.e., subscriber unit transmission is received by multiple base stations) whenever any forward link channel is in soft handoff.

In another exemplary embodiment, the fundamental code channel is placed in soft handoff (i.e., transmitting the same data bits from more than one base station) using the same handoff criteria described in IS-95 and the aforementioned U.S. Pat. No. 5,267,261, while putting supplemental code channels in soft handoff only under certain conditions. When the supplemental code channel is not in handoff, the supplemental code channels are only transmitted by the base station with the strongest pilot received at the subscriber unit. In order to implement the independent handoff of the supplemental and fundamental code channels, the Extended Handoff Direction Message, which directs the subscriber unit to the base stations currently transmitting data to it, should separately specify the base stations (or pilot PN offsets) transmitting the fundamental code channel and supplemental code channels.

In the following description there is disclosed a set of criteria that can be used to determine when to put supplemental code channels in soft handoff. The criteria include:

1. When the content (pilots, PN phases, and pilot strengths) of the Pilot Strength Measurement Message sent by the subscriber unit changes.

2. When the strength of the pilot used for the supplemental code channels changes significantly.

3. When the best base station (the one with the strongest pilot received at the subscriber unit) changes frequently.

4. When the sum of the strength of all the pilots received by the subscriber unit changes significantly.

5. When the error indicator bit (EIB) bit received in the reverse link frame flips, indicating that a forward link frame has been received in error.

6. When the quality of the reverse link frames received from different Active Set members alternate (i.e., the selector frequently selects received frames from different base stations in soft handoff).

7. When the mobile station, using its pilot filters, reports the relative strength of one pilot to another. This tells the base station which pilot channels should be in the Active Set for the supplementary channel.

8. When the strength of a pilot channel from a base station transmitting the fundamental channel increases relative to the strength of the pilot channel from a base station transmitting the high speed link.

Better forward link power control also results in larger forward link capacity. Thus, it is an objective of the present invention to describe an improved method for controlling the transmit power of the fundamental code channel and supplemental code channels to increase forward link capacity. The present invention envisions that the supplemental code channels may be transmitted at a different power level than the fundamental code channel. For example, since the data can be retransmitted upon detection of an error, the supplemental code channels—which carry data only, no signaling messages—may be transmitted at a lower power than the fundamental code channel. In this case, while the frame error rate (FER) on the supplemental code channels may be permitted to be higher, the data packet error rate with the availability of retransmissions will be the same as or even lower than the FER on the fundamental code channel in the absence of retransmission. In an alternative embodiment, such as data applications requiring very low error rate, the supplemental code channels may be transmitted at a higher power level than the fundamental code channel.

The the transmit power of the fundamental code channel may be controlled using the same forward power control method defined in IS-95 and ANSI-J-008. The supplemental code channels are transmitted at a power level with an adjustable offset (in dB) from the power of the fundamental code channel. The power of the supplemental code channels as well as the power of the fundamental code channel change the same incremental amount in response to the forward power control (therefore, the offset between the two remains unchanged). When the channel condition changes, the offset is adjusted in order to maintain a target FER on the supplemental code channel.

The criteria described above can be used to detect changes in channel condition. In addition, a message similar to the Power Measurement Report Message can be defined for reporting frame errors on the supplemental code channels. The NAK generated by the radio link protocol (RLP) set forth in IS-99 and described in greater detail below, as a result of a missing frame, can also be used to indicate received frame errors. The estimated FER can be used in turn to trigger the adjustment of the offset.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A novel and improved method and apparatus for controlling the transmit power necessary for the proper operation of a high rate link is described. In the following description, an embodiment of the invention is set forth in the context of a CDMA cellular telephone system operating in accordance with the IS-95 standard. While the invention is especially suited for operation with a cellular telephone system operating in accordance with the IS-95 standard, other wireless communication systems where interference reduction is desirable may incorporate the use of the present invention, including satellite based telecommunications systems.

Figure 2:
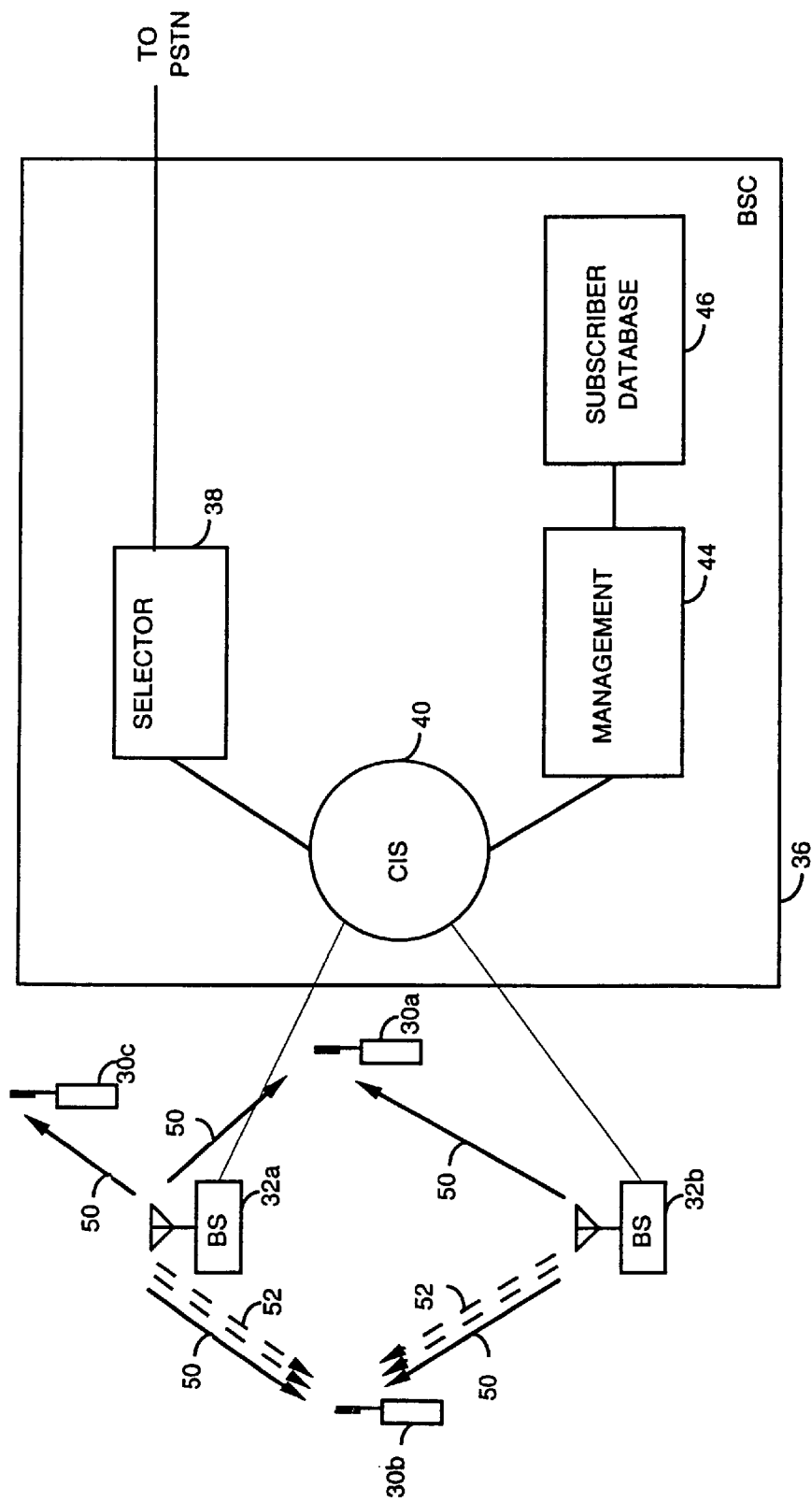
FIG. 2 is a block diagram of a cellular telephone system configured in accordance with one embodiment of the invention.

FIG. 2 is a block diagram of a portion of cellular telephone system configured in accordance with an exemplary embodiment of the invention. Subscriber units 30a, and 30b have established bidirectional links with both base stations 32a and 32b and therefore are in soft handoff, while subscriber unit 30c is only interfacing with base station 32a and therefore is engaged in a single link interface. Base stations 32a and 32b are coupled to CDMA interconnect subsystem (CIS) 40 via wire line connections.

CIS 40 is located within base station controller (BSC) 36 and is coupled to selector subsystem 38 and management system 44. Management system 44 is coupled to subscriber database 46. The various systems that make up BSC 36, as well as base stations 32, exchange data and control information via the use of network packets which contain an address that allows routing by CIS 40. During operation, management system 44 configures and controls selector subsystem 38 and base stations 32 using subscriber information contained in subscriber data base 46.

In accordance with one embodiment of the invention, the forward link signal from base stations 32a and 32b is comprised of a set of subsignals referred to as channels. The channels are formed by modulation of the transmitted data with one of a set of sixty-four orthogonal Walsh codes, which is consistent with the use of IS-95. Thus, up to sixty-four forward link channels may be transmitted within the forward link signal.

The forward link channels include a pilot channel which facilitates acquisition and processing of the forward link signal, as well as a set of traffic channels which are used to conduct the forward link portion of the telephone call or other communication with a subscriber unit 30. Both the signaling and traffic data transmitted over the various channels are formatted and processed in frames.

In the configuration shown, subscriber unit 30a is conducting a conventional, IS-95 style, lower rate bi-directional voice or data communication, and subscriber unit 30b is conducting a higher rate forward link communication combined with a lower rate reverse link communication in accordance with the high data rate links described in the above referenced high data rate patent applications. In accordance with this configuration, base stations 32a and 32b allocate a single forward link traffic channel designated as a fundamental channel 50 for communication with subscriber unit 30a. To establish the high rate communication with subscriber unit 30b, base stations 32a and 32b allocate a set of forward link traffic channels which are designated as a fundamental channel 50 and a set of supplemental channels 52. Supplemental channels 52 are shown as dashed lines because, as described below, they are not always transmitted from both base stations 32 during soft handoff.

In a preferred embodiment of the invention, the fundamental channel can be used to transmit both signaling data as well as primary and secondary traffic data, and the supplemental channel can be used to transmit primary or secondary traffic data, but not signaling data. Primary and secondary traffic data denote two subchannels for simultaneously transmitting two different types of user data such as voice and digital data.

In the preferred embodiment of the invention the fundamental channel is processed in the same or a similar manner as the conventional lower rate IS-95 forward link channel. Also, the supplemental channel is preferably generated in accordance with one of the above referenced high data rate patent applications.

In the preferred embodiment of the invention, the reverse link signals from both subscriber units 30a and 30b are comprised of a single lower rate channel. As is the case for an IS-95 system, the reverse link channel is formed via modulation of the transmitted data with a longer channel code that is unique to each subscriber unit 30. Additionally, for one of the possible transmission rates provided by IS-95 (typically referred to as Rate Set two) an error indicator bit (EIB) is included in each reverse link frame that indicates whether the last forward link frame was received correctly.

Higher rate reverse link signals may also be used. An example of a high rate reverse link signal is described in copending U.S. patent applications Ser. No. 08/766,372 entitled "Phase Shift Encoded Subchannel" and Ser. No. 08/654,433 entitled "High Data Rate CDMA Wireless Communication System" both assigned to the assignee of the present invention and incorporated herein by reference.

The data frames received by base station 32a via the reverse link signal are routed as network packets by CIS 40 to selector subsystem 38. Selector subsystem 38 allocates a selector resource for each call being processed. In the preferred embodiment of the invention, a selector resource is a microprocessor executing a set of software instructions (not shown).

For subscriber unit 30a, which is operating in the conventional lower rate mode, soft handoff is conducted in the conventional fashion. That is, both base stations 32a and 32b allocate a fundamental channel 50 for transmission of the same forward link data to subscriber unit 30a. Additionally, base stations 32a and 32b both attempt to process the reverse link signal from subscriber unit 30a thereby generating received data frames that are forwarded to selector subsystem 38 within BSC 36. A system and method for performing soft handoff is also described in U.S. Pat. No. 5,101,501 entitled "Method and System for Providing a Soft Handoff in Communications in a CDMA Cellular Telephone System" assigned to the assignee of the present invention and incorporated herein by reference.

Figure 1:
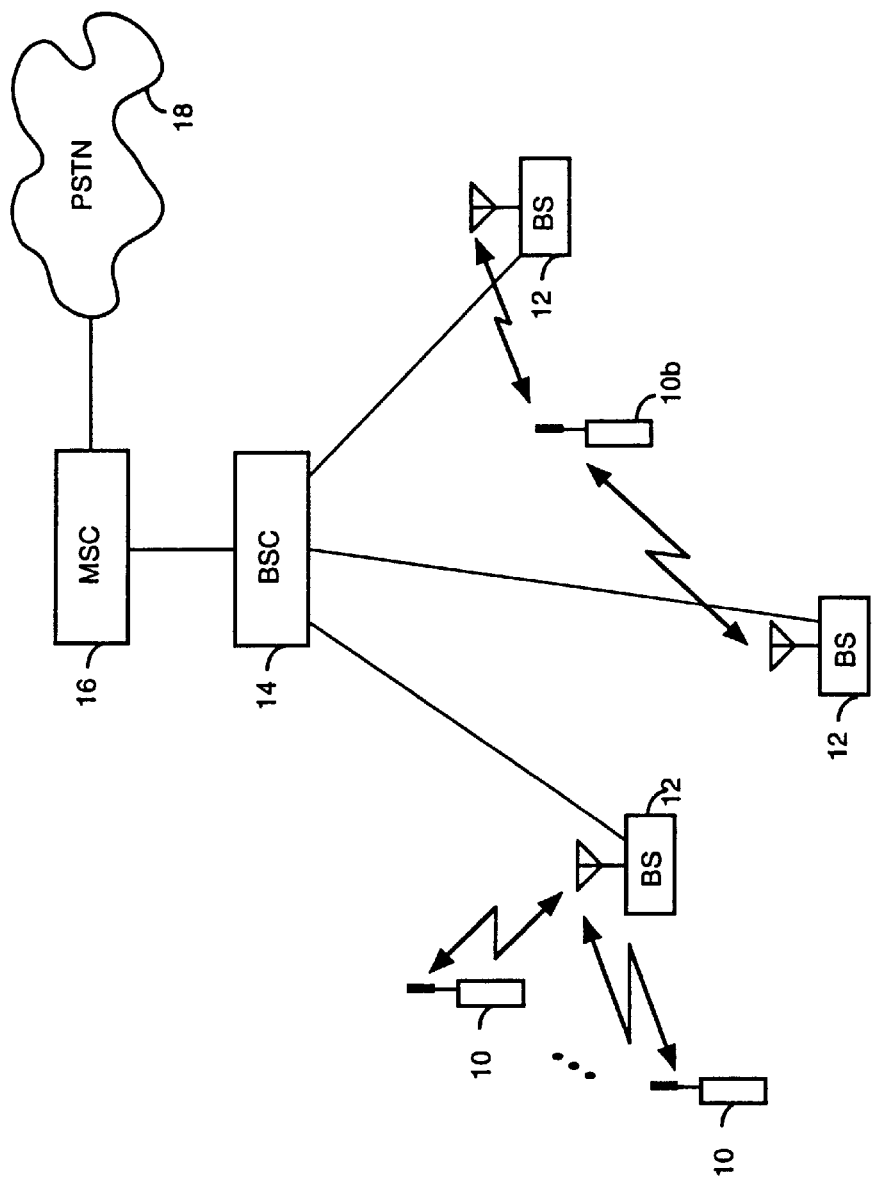
FIG. 1 is a block diagram of a cellular telephone system.

The selector resource within selector subsystem 38 assists in conducting the conventional soft handoff by performing both frame selection and frame distribution. Frame selection is the repeated selection of one of the two reverse link frames received from base stations 32a and 32b based on quality indication information contained in each network packet. The selected frame is devocoded and forwarded to MSC 16 (FIG. 1) for further processing.

Frame distribution is the repeated duplication and distribution of forward link frames to base stations 32a and 32b for transmission to subscriber unit 30a. As noted above, more than two base stations 32 can be involved in a soft handoff, and thus frame selection and frame distribution can involve the repeated processing of more than two frames.

The selector resource further assists in processing the conventional soft handoff by exchanging signaling messages with subscriber unit 30a in order to orchestrate the soft handoff. One such signaling message is a Pilot Strength Measurement Message (PSMM) which is generated by the subscriber unit 30 and received by the selector resource. The PSMM lists the set of pilot channels detected during repeated searches performed by subscriber unit 30a including the signal strength and PN phase at which each pilot channels was received. The PSMM provides an indication of the set of base stations 32 that subscriber unit 30a can successfully communicate with. In a preferred embodiment of the invention, a PSMM is generated when the strength and duration of a pilot channel changes in accordance with that described in U.S. Pat. No. 5,267,261 referenced above.

In response to the PSMM the selector resource determines if a soft handoff is necessary and if so, transmits an Extended Handoff Direction Message (EHDM) to the subscriber unit 30a. Additionally, the selector instructs the target base station 32 (i.e. the base station from which the new RF interface is being established) to begin searching for the reverse link signal from the subscriber unit 30. Also, the selector resource instructs the target base station 32 to allocate a forward link traffic channel for establishing the fundamental channel, and to begin transmitting forward link frames to the subscriber unit via the fundamental channel. Once the reverse link signal has been acquired by the target base station 32 then both base stations 32 are receiving and processing the reverse link signal from subscriber unit 30b.

In accordance with the preferred embodiment of the invention, all base stations 32 transmitting the fundamental channel will receive and process the reverse link signal. As noted above, while this exemplary embodiment of the invention describes a soft handoff using two base stations 32, soft handoffs can involve more than two base stations 32. At this point, the soft handoff reaches steady state condition where both base stations 32 transmit the forward link channel and receive the reverse link channel.

As noted above, subscriber unit 30b is engaged in a high speed forward link which includes a fundamental channel and a set of one or more supplemental channels. In accordance with one embodiment of the invention, the transmission of the fundamental channel and the supplemental channels from base stations 32a and 32b are controlled independently from one another during soft handoff. In the implementation of the invention described herein, it is the selector resource processing the communication with subscriber unit 30b that performs the control as described below.

In accordance with an exemplary embodiment of the invention, the selector resource tracks the Pilot Strength Measurement Messages (PSMM) as they are received from subscriber unit 30b. Also, as practiced in IS-95 compatible systems, a PSMM contains three parameters for each pilot channel being reported on. The parameters includes the strength of the pilot channel, the PN phase of the pilot channel, and the identity of the pilot channel. The identity is provided as a PILOT_PN offset that is unique for each pilot channel in a given area.

The selector resource monitors the behavior of the parameters as reported over a set of PSMM's. Additionally, the selector resource monitors each PSMM to determine if a soft hand off is necessary in accordance with the above referenced '261 patent. When it is determined that a soft handoff is necessary, the selector resource adjusts the manner in which the soft handoff is conducted for the high rate link based on the behavior detected in any one of the three parameters.

In a preferred embodiment of the invention, when the behavior detected over a set of PSMM's indicates that a non-fading (typically a static multipath or additive white Gaussian noise (AWGN)) channel exists to subscriber unit 30b, the high speed link can be conducted more efficiently by transmitting the supplemental channels from a stations 32. If, however, the behavior detected indicates a fading channel exists to subscriber unit 30b, the supplemental channels are transmitted from both base stations 32 involved in the soft handoff. In both cases base stations 32a and 32b transmit the fundamental channel. In many instances, a fading channel corresponds to a moving subscriber unit 30b and a non-fading channel corresponds to a stationary subscriber unit 30b. Also, in other embodiments of the invention described herein, information other than that contained in the PSMM's is used to determined the channel condition.

Once the channel condition has been determined, the selector resource notifies subscriber unit 30b which base stations 32 will be transmitting the supplemental channels using the Extended Handoff Direction Message transmitted to subscriber unit 30b via the fundamental channel. In the preferred embodiment of the invention, the base station 32 selected to transmit the supplemental channels is the one with the strongest pilot reported in the Pilot Strength Measurement Message.

Figure 3:
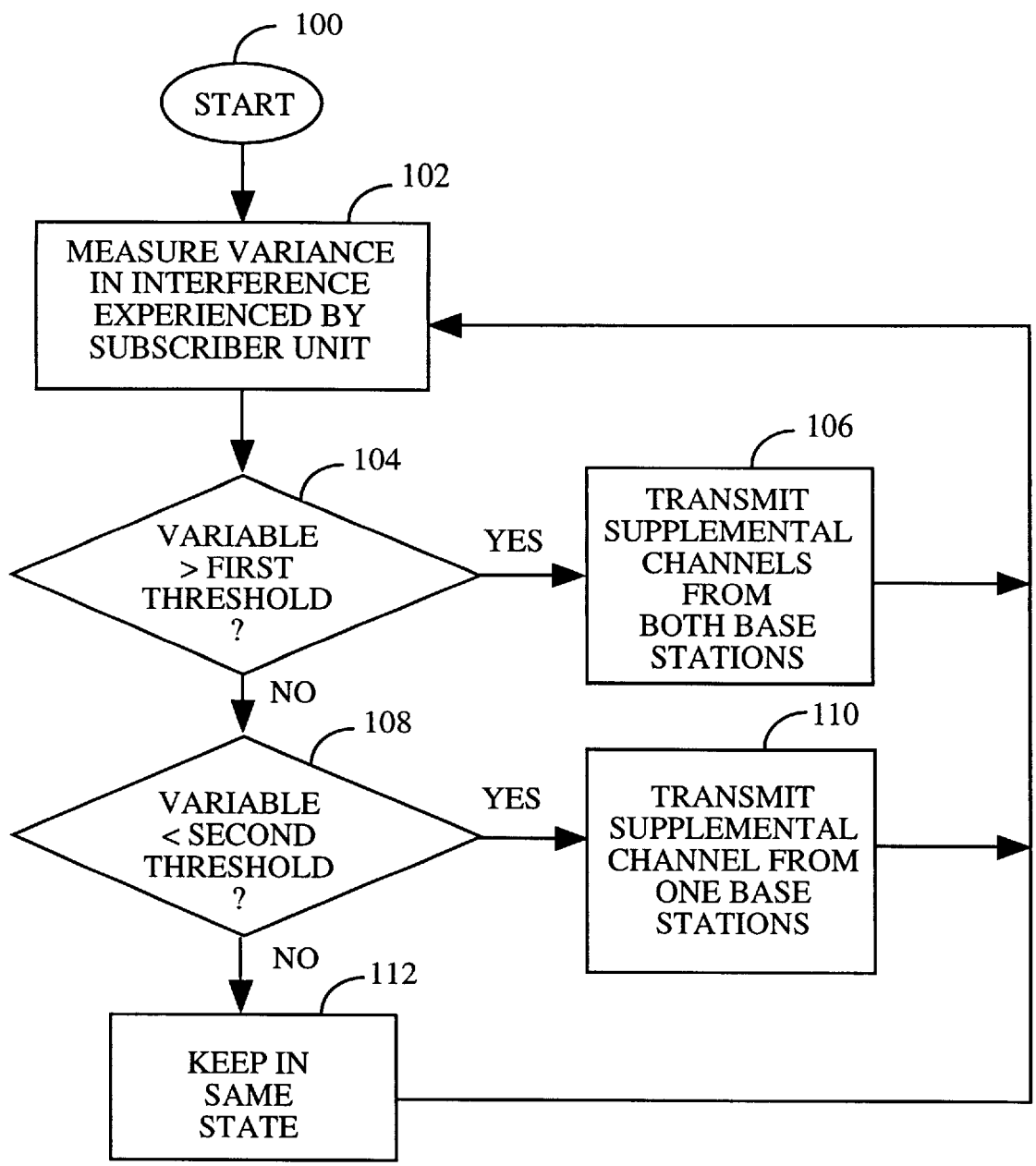
FIG. 3 is a flow diagram illustrating the operation of a cellular telephone system in accordance with one embodiment of the invention.

FIG. 3 illustrates the operation of the cellular telephone system during soft handoff when configured in accordance with one embodiment of the invention. The operation begins at step 100 and at step 102 the channel condition experienced by the subscriber unit 30b is monitored. At step 104, it is determined if a fading channel condition exists, and if so the supplemental channels are transmitted from both base stations involved in the soft handoff at step 106. Step 102 is then performed again.

If a fading channel does not exist the supplemental channels are transmitted from only one base station involved in the soft handoff at step 110. In the preferred embodiment of the invention, the base station 32 selected to transmit on both the fundamental and supplemental channels is the base station for which the associated pilot channel is received with the greatest strength. After the system is configured at step 110, step 102 is performed again.

By monitoring the channel condition the selector resource can determine the more optimal method for conducting the high data rate soft handoff and therefore increase overall system capacity. In general, a stationary subscriber unit 30b is more likely to experience an additive white Gaussian noise (AWGN) channel or static multipath conditions while a moving subscriber unit 30b is more likely to experience a fading channel. AWGN or static multipath channels do not benefit from spatial diversity of signal source while signals transmitted through fading channel can benefit from spatial diversity of signal source.

Thus, by transmitting the supplemental channels from only one base station 32 in an AWGN or static multipath channel condition, the amount of additional interference generated by the soft is reduced handoff without impacting performance. The performance is not impacted because in an AWGN channel condition, the benefit derived from transmitting the same forward link channel twice is reduced. Thus, transmitting the supplemental channels from only one base station is more optimal under these conditions.

Furthermore, by transmitting the fundamental channel from both base stations 32, the reliability of the signaling messages transmitted during soft handoff is maintained. If voice is transmitted on the fundamental channel, then high reliability is maintained for the voice as well. Keeping signaling message transmission reliable maintains the robustness of the soft handoff, as changes in the channel condition can be compensated for by reconfiguration via exchange of more signaling messages between the selector resource and subscriber unit 30b.

The channel condition experienced by subscriber unit 30b will generally be based on a variety of environmental factors including the load on each base station 32 and the geographic environment of the surroundings. Additionally, the channel condition also depends on the rate at which subscriber unit 30b is moving. Thus, if the subscriber unit is stationary, the selector will typically establish the soft handoff using one base station 32 for the supplemental channels. Therefore, such action by the selector is particularly useful when subscriber unit 30b is not moving.

Various implementations of the invention use different criteria to determine the channel condition based on the set of PSMM's received from subscriber unit 30b. In one embodiment of the invention, the selector monitors for changes in the source of the strongest pilot channel as measured for the two or more base stations 32 involved in the soft handoff. If the source of the strongest pilot channel changes in excess of a given rate, the selector resource configures the set of base stations 32 to transmit the supplemental channels.

The selector resource can also monitor the PSMM's for changes in the sum of the pilot channel strengths reported. If the sum of the pilot channel strengths reported changed by more than a predetermined amount, or faster than a predetermined rate, the selector resource responds by configuring the other base station (or base stations) to transmit the supplemental channels as well.

The selector resource can also monitor the PSMM's for changes in the pilot identities reported. If the identities of the pilots reported changes the selector resource responds by configuring the other base station 32 (or base stations) to transmit the supplemental channels as well.

The selector resource can also monitor the PSMM's for changes in the pilot PN phases reported. If the pilot PN phases reported change by more than a predetermined amount, or faster than a predetermined rate, the selector resource responds by configuring the other base station 32 (or base stations) to transmit the supplemental channels as well. The pilot PN phase is the state of the pseudorandom noise (PN) code used to generate the pilot channel, and changes in the pilot PN phase indicate changes in the distance between subscriber unit 30b and the corresponding base stations 32. The above mentioned parameters can also be monitored by the subscriber unit 30b, and when one of the parameters changes more than an associated threshold, subscriber unit 30b responds by reporting the change using signaling. This allows the selector resource to respond to changing condition while minimizing the number of signaling messages, as subscriber unit 30b will not transmit any such signaling if the parameters do not change by a sufficient amount.

In another variation of the invention, the selector resource monitors the EIB bits received via the reverse link. Thus, the channel condition is determined using information not contained in PSMM's. As noted above, EIB bits with a value of logic one indicate errors at the subscriber unit 30b in reception of the forward link frames. Therefore, receipt of a significant number of EIB bits with values equal to one indicates a channel condition worse than expected. If the soft handoff is being conducted using a single transmission of the supplemental channel forward link signal, and the frame error rate exceeds a predetermined threshold, the selector responds by configuring the other base station 32 (or base stations) to transmit the supplemental channels as well.

In still another embodiment of the invention, the selector resource monitors the source of the frames selected during frame selection. As described above, call selection is the repeated selection of reverse link frame every 20 ms from base stations 32a and 32b based on the quality of the frame. If the source (i.e. base station) of the selected frames changes at a rate above a predetermined threshold, this indicates a fading channel condition which implies subscriber unit 30b is non-stationary. The selector resource responds to such rapid changes in the source of the selected frame by configuring both base stations 32 involved in the soft handoff to transmit the supplemental channels.

In the case of softer handoff, which is a handoff between two sectors of the same base station, frame selection is not performed since the signals are combined at the base station 32. For softer handoff, the base station can report changes in the relative strengths of the various mutipath instances, or "paths" of the reverse link signal being processed to the selector resource. The selector resource then determines whether the source of the strongest path is changing, and if so configure the sectors in accordance with a fading channel. That is, the selector resource configures both sectors to transmit the fundamental and supplemental channels.

In another embodiment of the invention, subscriber unit 30b generates PSMM's when the strength of the pilot channel from a base station 32 transmitting only the fundamental channel exceeds a threshold T_COMP_SUP less than the strength of the weakest pilot from a base station 32 transmitting the supplemental channels. The selector resource responds by instructing the base station 32 transmitting only the fundamental channel to begin transmitting the supplementary channels.

Other factors may be used to determine which base station 12 should transmit the supplemental channels. In particular, each base station 12 can monitor the amount of transmit power available for the supplemental channels, and if it exceeds a predetermined threshold, indicate such to the selector resource. The selector resource responds by designating a different base station 12 to transmit the supplemental channels. The base station 12 chosen is the one being received at the next highest strength. The predetermined threshold can be based on a variety of factors including the maximum transmit power capability of the base station 12.

As the soft handoff is conducted, the selector constantly evaluates the channel condition, and if the channel condition changes the soft handoff is reconfigured. For example, if a fading channel becomes a non-fading channel, the selector resource configures one base station 12 to stop transmitting the supplemental channel.

The base station 12 may also examine whether the strength of the reported pilot channel is within a second threshold, T_ADD_SUP, of the strength of the weakest pilot channel already transmitting the supplementary channels before deciding whether to transmit the supplementary channels from the second base station 12.

The subscriber unit 30b may also have a T_DROP_SUP which behaves very similar to the T_DROP threshold in IS-95 for use with the fundamental channel. In this case, if the pilot corresponding to a supplemental channel falls below T_DROP_SUP relative to the strongest pilot having a supplemental channel, the subscriber unit reports the pilot. In this case, the selector resource may stop transmitting reported base station 12 from transmitting the supplemental channels.

In another exemplary embodiment of the invention, the impact of the transmission of high rate data on the capacity of the system is further reduced by transmitting the fundamental channel at a different power than the supplemental channels during either soft handoff or single interface communication, or both. In one embodiment of the invention, the supplemental channels are transmitted at a lower power level than the fundamental channel. Since the supplemental channels carry only data which is protected by the radio link protocol (set forth in IS-99 and IS-657, and described in greater detail below), rather than signaling, the modest increase in the frame error rate caused by this lower transmit power will not result in damage to the data integrity.

Additionally, if an error in the transmission of data over the supplemental channel is experienced, the affected data frame can be retransmitted at some later time. Indeed, the data transfer protocol standard IS-99 and IS-657, designed for use with the IS-95 standard, provides a radio link protocol (RLP) whereby improperly received frames are retransmitted. Retransmission is more suitable for data transmissions, when compared to voice, because data transmissions are generally more tolerant of delay than voice transmissions. For voice transmissions a delay of more than 100 ms (one tenth of a second) are noticeable during a conversation.

Retransmissions of improperly received frames substantially reduces the effective error rate of the data channel (also called the packet error rate) relative to the actual frame error rate (FER). In many instances, the benefit of RLP retransmission is sufficiently large that the effective error rate of the supplemental channel is less than the effective error rate of the fundamental channel without RLP (the frame error rate). Thus, by reducing the transmit power of the supplemental channels and retransmitting bad frames, the total transmit power of the high speed forward link is reduced without impacting performance.

It should be noted that in some embodiments of the invention the combined transmit power of the fundamental and supplemental channels is also adjusted in unison in response to other power control commands. During these combined adjustments, the relative transmit power of the supplemental and fundamental channels remains the same.

In an alternative embodiment of the present invention, the supplemental channel is transmitted at a power level that is at a predetermined offset relative the power level at which the fundamental channel is transmitted. In this second embodiment of the invention, the offset is adjusted upon detection of a change in channel condition. The change in channel condition can be detected by any of the methods described above.

The transmit power of the fundamental and supplemental channels is preferably controlled by the selector resource, which transmits power adjustment signaling to the base stations 32 transmitting the fundamental and supplemental channels. Each base station responds by adjusting the transmit power of the supplemental channels and the fundamental channel.

To allow the selector to determine the proper adjustment, the frame error information of the fundamental channel and the supplemental channels are transmitted by subscriber unit 30b via reverse link signaling messages or the EIB bits. For example, a Power Strength Measurement Report (PSMR) message could be defined which provides the error rate of each supplemental channel. The error information can also be conveyed using RLP negative-acknowledgment (NAK) transmitted by subscriber unit 30b on the reverse link in accordance with the use of IS-99 or IS-657. A NAK indicates that a data frame was not received properly, allowing the selector resource to determine which frames were not received correctly, and thus the frame error rate as well as the actual error rate after retransmission.

In an alternative embodiment of the invention the error rate is determined from power control commands or other error rate indication information transmitted in a power control subchannel included in the reverse link signal. Examples of reverse link signals that include power control subchannels are provided in copending U.S. patent applications Ser. No. 08/766,372 entitled "Phase Shift Encoded Subchannel" and Ser. No. 08/654,433 entitled "High Data Rate CDMA Wireless Communication System" both assigned to the assignee of the present invention and incorporated herein by reference. Additionally, a reverse link subchannel is also described in U.S. Pat. No. 5,383,219 entitled "Fast Forward Link Power Control in a Code Division Multiple Access System" assigned to the assignee of the present invention and incorporated herein by reference.

The error rate could also be determined using the error indicator bits included in Rate Set 2 frames.

In another embodiment of the invention the supplemental channels can be transmitted at a higher transmit power than the fundamental channel. This would be the case when the data being transmitted via the supplemental channel requires a very low error rate, or was delay sensitive and could not be retransmitted, or both. In an example of such a communication, the subscriber unit 30b notifies the selector resource via signaling that delay intolerant data is being transmitted, and the selector responds by increasing the transmit power of the supplemental channel via additional signaling transmitted to base stations 32. Transmitting the supplemental channels at a higher power further can increase the capacity of the cellular telephone system because it reduces the need to generate multiple transmissions of the supplemental channels from two base stations 32 during soft handoff.

Thus, a novel and improved method and apparatus for controlling the transmit power necessary for the proper operation of a high rate link is described. The previous description of the preferred embodiments is provided to enable any person skilled in the art to make or use the present invention. For example, combinations of any of the methods for detecting the channel condition described above may be used. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of controlling handoff in a communication system in which data is transmitted to a subscriber unit by providing a first subset of said data on at least one fundamental channel and a second subset of said data on at least one supplemental channel, the method comprising:

receiving pilot strength measurement messages from said subscriber unit;

selecting a plurality of base stations for providing transmissions to said subscriber unit on said at least one fundamental channel based on said pilot strength measurement messages;

selecting at least one of said plurality of base stations for providing transmissions to said subscriber unit on said at least one supplemental channel; and transmitting to said subscriber unit an extended handoff direction message indicating the identities of said plurality of base stations for communication of said first subset of data and indicating the identity of said at least one of said plurality of base stations for communication of said second subset of data;

wherein signaling data is carried only on said at least one fundamental channel.

2. The method of claim 1 wherein said step of independently selecting at least one of said plurality of base stations comprises:

determining whether said subscriber unit is stationary; and selecting a base station corresponding to the strongest pilot signal in said pilot strength measurement messages as said at least one of said plurality of base stations when said subscriber unit is determined to be stationary.

3. The method of claim 1 wherein said step of independently selecting at least one of said plurality of base stations comprises:

comparing the strengths of pilot signals in said pilot strength measurement messages with the strengths of pilot signals in a prior set of pilot strength measurement messages to determine an amount of change in said pilot strengths; and selecting a plurality of base stations to communicate with said subscriber unit when said amount of change in said pilot strengths exceeds a predetermined threshold.

4. The method of claim 1 wherein said step of independently selecting at least one of said plurality of base stations comprises:

comparing the strengths of pilot signals in said pilot strength measurement messages with the strengths of pilot signals in a prior set of pilot strength measurement messages to determine a rate of change in said pilot strengths; and selecting a plurality of base stations to communicate with said subscriber unit when said rate of change in said pilot strengths exceeds a predetermined threshold.

5. The method of claim 1 wherein said step of independently selecting at least one of said plurality of base stations comprises:

summing the strengths of pilot signals in said pilot strength measurement messages;

comparing said sum of strengths of pilot signals in said pilot strength measurement messages with a sum of strengths of pilot signals in a prior set of pilot strength measurement messages to determine a change in said sum of pilot strengths; and selecting a plurality of base stations to communicate with said subscriber unit when said change in said sum of pilot strengths exceeds a predetermined threshold.

6. The method as claimed in claim 5, wherein said change in said sum of pilot strengths corresponds to an amount of change in said sum of pilot strengths.

7. The method as claimed in claim 5, wherein said change in said sum of pilot strengths corresponds to a rate of change in said sum of pilot strengths.

8. The method of claim 1 further comprising:

determining at said subscriber unit the presence of frame errors in said data;

generating an error indicator message in accordance with said determination of the presence of frame errors in said data; and transmitting said error indicator message;

wherein said step of selecting at least one of said plurality of base stations is performed in accordance with said error indicator message.

9. The method of claim 8 wherein said step of selecting at least one of said plurality of base stations in accordance with said error indicator message comprises selecting a plurality of base stations when the frame error rate exceeds a predetermined threshold.

10. The method as claimed in claim 1, wherein said fundamental channel transmits at a power level different than said at least one supplemental channel.

11. The method as claimed in claim 1, wherein said at least one fundamental channel carries signaling data and traffic data.

12. The method as claimed in claim 1, wherein said at least one fundamental channel and said at least one supplemental channel transmit said data simultaneously.

13. A method of controlling handoff in a communication system in which data is transmitted to a subscriber unit by providing a first subset of said data on a fundamental channel and a second subset of said data on at least one supplemental channel, the method comprising:

receiving pilot strength measurement messages from said subscriber unit;

selecting a plurality of base stations for providing transmissions to said subscriber unit on said fundamental channel based on said pilot strength measurement messages; and selecting at least one of said plurality of base stations for providing transmissions to said subscriber unit on said at least one supplemental channel;

wherein said step of independently selecting at least one of said plurality of base stations comprises:
  determining whether said subscriber unit is stationary; and
  selecting a base station corresponding to the strongest pilot signal in said pilot strength measurement messages as said at least one of said plurality of base stations when said subscriber unit is determined to be stationary.

14. The method as claimed in claim 13, wherein said fundamental channel transmits at a power level different than said at least one supplemental channel.

* * * * *

UNITED STATES PATENT AND TRADEMARK OFFICE
CERTIFICATE OF CORRECTION

PATENT NO : 5,987,326
DATED : November 16, 1999
INVENTOR(S) : Tiedemann, Jr., et al It is certified that error appears in the above-identified patent and that said Letters Patent are hereby corrected as shown below:

In the title please change "Transmit Power Reduction For a High Speed CDMA Link in Soft Handoff" to --A Method for Controlling Handoff in a Communication System--.

Signed and Sealed this

Fifteenth Day of May, 2001

*Attest:*

NICHOLAS P. GODICI

*Attesting Officer*     *Acting Director of the United States Patent and Trademark Office*